US012326293B2

(12) United States Patent
Nishimura et al.

(10) Patent No.: US 12,326,293 B2
(45) Date of Patent: Jun. 10, 2025

(54) DRAINAGE CAP AND COLD STORAGE

(71) Applicant: PHC Holdings Corporation, Tokyo (JP)

(72) Inventors: Takumi Nishimura, Ehime (JP); Takanari Kabumoto, Ehime (JP); Eiji Doi, Ehime (JP); Mitsuyuki Shirata, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 212 days.

(21) Appl. No.: 18/108,355

(22) Filed: Feb. 10, 2023

(65) Prior Publication Data

US 2023/0184479 A1 Jun. 15, 2023

Related U.S. Application Data

(63) Continuation of application No. PCT/JP2022/004128, filed on Feb. 2, 2022.

(30) Foreign Application Priority Data

Feb. 9, 2021 (JP) ................................ 2021-019073

(51) Int. Cl.
*F25D 21/14* (2006.01)
*E05D 15/08* (2006.01)
*F25D 23/02* (2006.01)

(52) U.S. Cl.
CPC ............ *F25D 21/14* (2013.01); *E05D 15/08* (2013.01); *F25D 23/021* (2013.01); *F25D 23/028* (2013.01); *E05Y 2201/684* (2013.01); *E05Y 2800/12* (2013.01); *E05Y 2900/102* (2013.01); *F25D 2321/142* (2013.01); *F25D 2321/143* (2013.01); *F25D 2321/146* (2013.01)

(58) Field of Classification Search
CPC .......... E06B 7/14; F25D 21/14; F25D 23/021; F25D 23/028; F25D 2321/146
See application file for complete search history.

(56) References Cited

U.S. PATENT DOCUMENTS 1,154,141 A * 9/1915 Tait ......................... F25D 21/14 137/247.33
2,582,031 A * 1/1952 Harbison .................. E03D 1/01 62/289

(Continued)

FOREIGN PATENT DOCUMENTS

CN 106225395 A 12/2016
EP 3730876 A1 10/2020

(Continued)

OTHER PUBLICATIONS

International Search Report dated Mar. 22, 2022 issued in International Patent Application No. PCT/JP2022/004128, with English translation.

(Continued)

*Primary Examiner* — Christopher R Zerphey
(74) *Attorney, Agent, or Firm* — Rimon P.C.

(57) ABSTRACT

A drainage cap includes: a body part configured to be inserted to a drainage outlet; and a flange part provided at the body part, and including a notch and an opposing part at a peripheral portion of the flange part, the opposing part being configured to face a peripheral portion of the drainage outlet.

11 Claims, 10 Drawing Sheets

(56) References Cited

U.S. PATENT DOCUMENTS

| | | | | |
|---|---|---|---|---|
| 2,594,073 A * | 4/1952 | Robbins | F25D 21/14 285/19 |
| 4,843,835 A * | 7/1989 | Goetz | F25D 21/14 62/291 |
| 9,857,117 B2 * | 1/2018 | Kim | F25C 5/182 |
| 12,130,068 B2 * | 10/2024 | Wang | F25D 21/04 |

FOREIGN PATENT DOCUMENTS

| | | |
|---|---|---|
| JP | S58-073894 U | 5/1983 |
| JP | S58-142280 U | 9/1983 |
| JP | S59-172677 U | 11/1984 |
| JP | 10-339559 A | 12/1998 |
| JP | 3404308 B2 | 5/2003 |
| JP | 2018-068836 A | 5/2018 |
| JP | 2021-059922 A | 4/2021 |
| KR | 20-0331749 Y1 | 11/2003 |
| KR | 10-0725497 B1 | 6/2007 |

OTHER PUBLICATIONS

Extended European Search Report dated Dec. 11, 2023 issued in the corresponding European Patent Application No. 22752657.1.

* cited by examiner

DRAINAGE CAP AND COLD STORAGE

CROSS-REFERENCE OF RELATED APPLICATIONS

This application is a Continuation of International Patent Application No. PCT/JP2022/004128, filed on Feb. 2, 2022, which in turn claims the benefit of Japanese Patent Application No. 2021-019073, filed on Feb. 9, 2021, the entire disclosures of which Applications are incorporated by reference herein.

TECHNICAL FIELD

The present disclosure relates to a drainage cap and a cold storage.

BACKGROUND ART

PTL 1 discloses a double sliding sash. The double sliding sash drains water accumulated in a lower frame of the sash frame to the outside from a plurality of drainage outlets. An interior drainage device is disposed at one of the plurality of drainage outlets. The interior drainage device includes a drainage valve for preventing entry of outside air into the interior. A drainage cap is disposed at another one of the plurality of drainage outlets. A grid for preventing entry of foreign matters and the like into the drainage outlet is formed at the drainage cap.

CITATION LIST

Patent Literature

PTL 1
Japanese Patent Publication No. 3404308

SUMMARY OF INVENTION

Technical Problem

In a cold storage that stores drugs and the like at a low temperature, the temperature difference between the inside and outside of the storage is relatively large, and as such condensation tends to easily occur at the door for opening and closing the storage compartment. As a result, a relatively large amount of condensation water is accumulated at the frame body where the door is disposed. As such, it is necessary to improve the drainage performance for the condensation water.

An object of the present disclosure is to provide a drainage cap and a cold storage that improve the drainage performance

Solution to Problem

To achieve the above-mentioned object, a drainage cap according to an embodiment of the present disclosure includes: a body part configured to be inserted to a drainage outlet; and a flange part provided at the body part, and including a notch and an opposing part at a peripheral portion of the flange part, the opposing part being configured to face a peripheral portion of the drainage outlet.

A cold storage according to an embodiment of the present disclosure includes: the above-described drainage cap; and a frame body in which the drainage outlet is formed and a sliding door is disposed, wherein the drainage outlet is formed at a position near an end portion of the sliding door in a closed state.

Advantageous Effects of Invention

The drainage cap and the cold storage of the present disclosure can improve the drainage performance.

DESCRIPTION OF EMBODIMENTS

Figure 1:
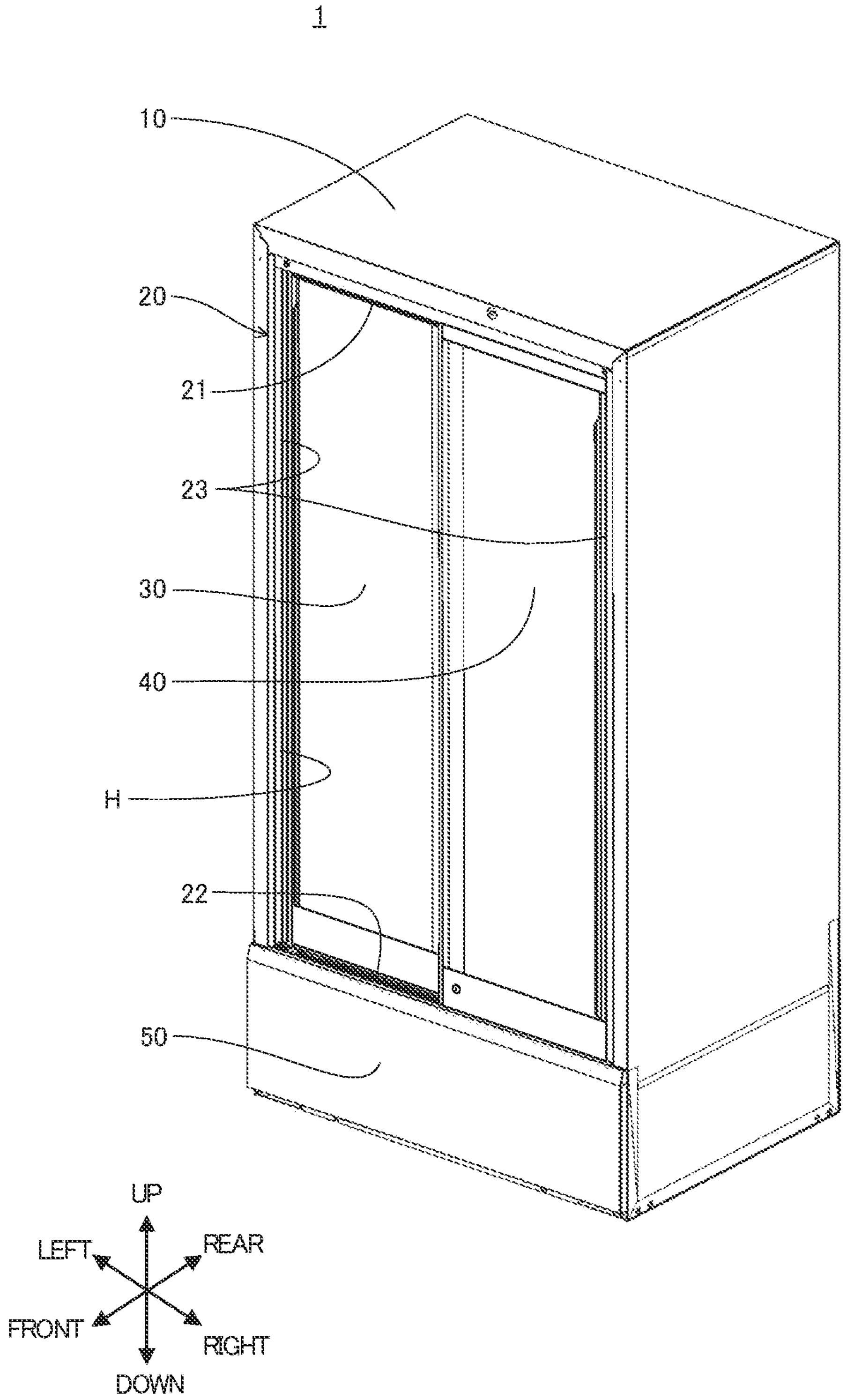
FIG. 1 is a perspective view of a cold storage according to an embodiment of the present disclosure.

A cold storage and a drainage cap according to an embodiment of the present disclosure are described below with reference to the drawings. Note that in the following description, as indicated with the arrow in FIG. 1, the lower left side and upper right side in FIG. 1 are the front side and rear side, respectively of cold storage 1; the upper left side and lower right side thereof are the left side and right side, respectively of cold storage 1; and the upper side and lower side thereof are the upper side and lower side, respectively of cold storage 1.

Cold storage 1 is a cold storage for drugs that stores drugs at a low temperature. Note that cold storage 1 may be a cold storage for blood or an incubator. As illustrated in FIG. 1, cold storage 1 includes housing 10, frame body 20, inner sliding door 30, outer sliding door 40, and machine storage 50. Inner sliding door 30 and outer sliding door 40 are examples of "sliding door".

Housing 10 is formed in a box shape with opening H that opens through movement of sliding doors 30 and 40 at the front surface. A heat insulation material is provided between the outer surface and inner surface of housing 10. The space surrounded by the inner surface of housing 10 is storage compartment R1, which is a space for storing drugs.

Frame body 20 is provided in housing 10 to surround opening H. Frame body 20 is provided such that inner sliding door 30 and outer sliding door 40 are movable in the left-right direction. Frame body 20 includes upper frame 21, lower frame 22 and vertical frame 23.

As illustrated in FIGS. 2 to 7, lower frame 22 is provided with inner rail 25 that guides inner sliding door 30, outer rail 26 that guides outer sliding door 40, and drainage outlet 24 to which drainage cap 60 is attached.

Inner rail 25 is composed of a pair of inner rails 25*a* and 25*b*. Inner rail 25 is provided on the rear side of lower frame 22 to extend along the left-right direction from the left end portion to the right end portion. Outer rail 26 is composed of a pair of outer rails 26*a* and 26*b*. Outer rail 26 is provided on the front side of inner rail 25 to extend along the left-right direction from the left end portion to the right end portion of lower frame 22. Inner rails 25*a* and 25*b* and outer rails 26*a* and 26*b* are examples of "rail".

Figure 5:
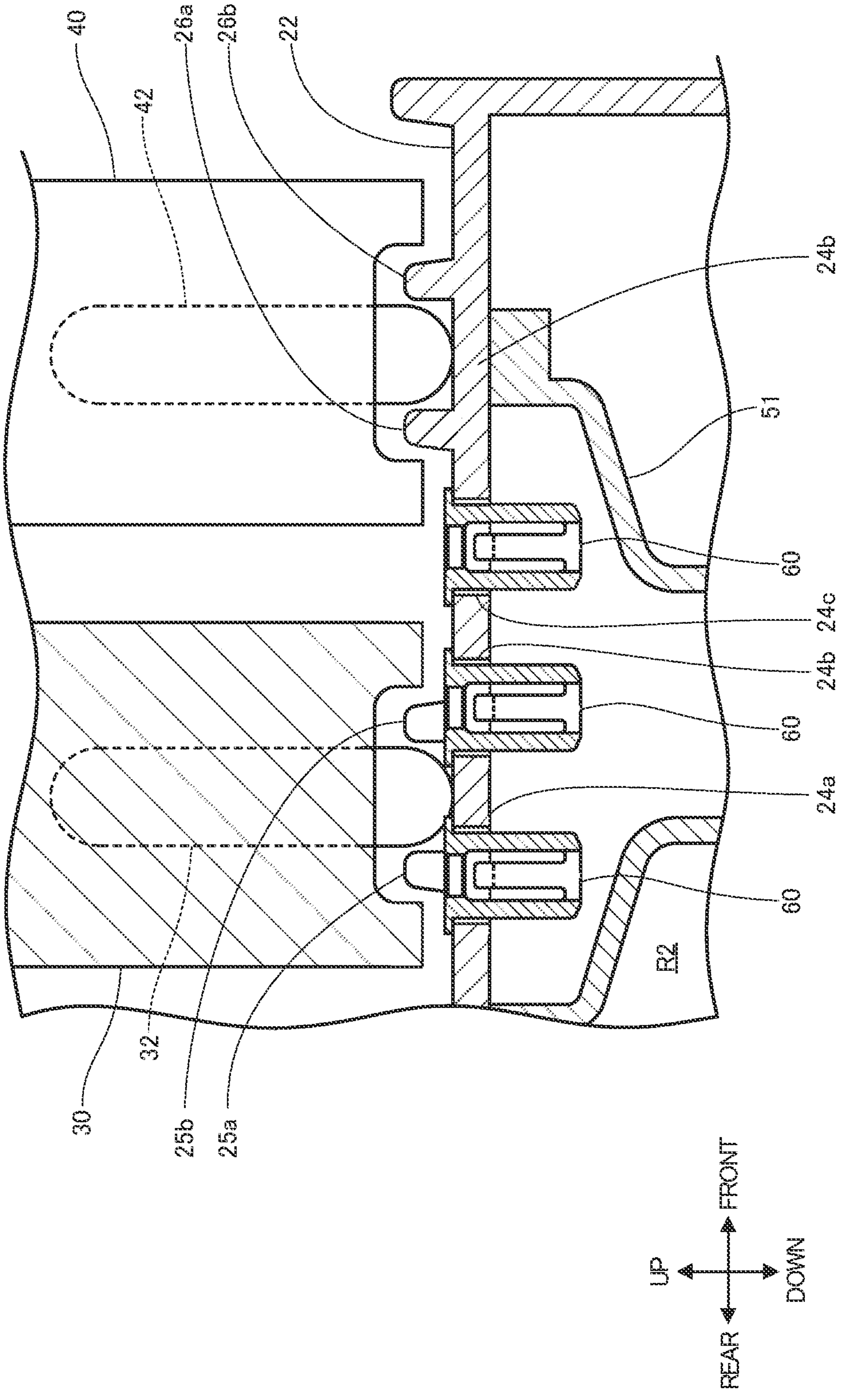
FIG. 5 is a sectional view taken along line V-V of FIG. 2.
Figure 6:
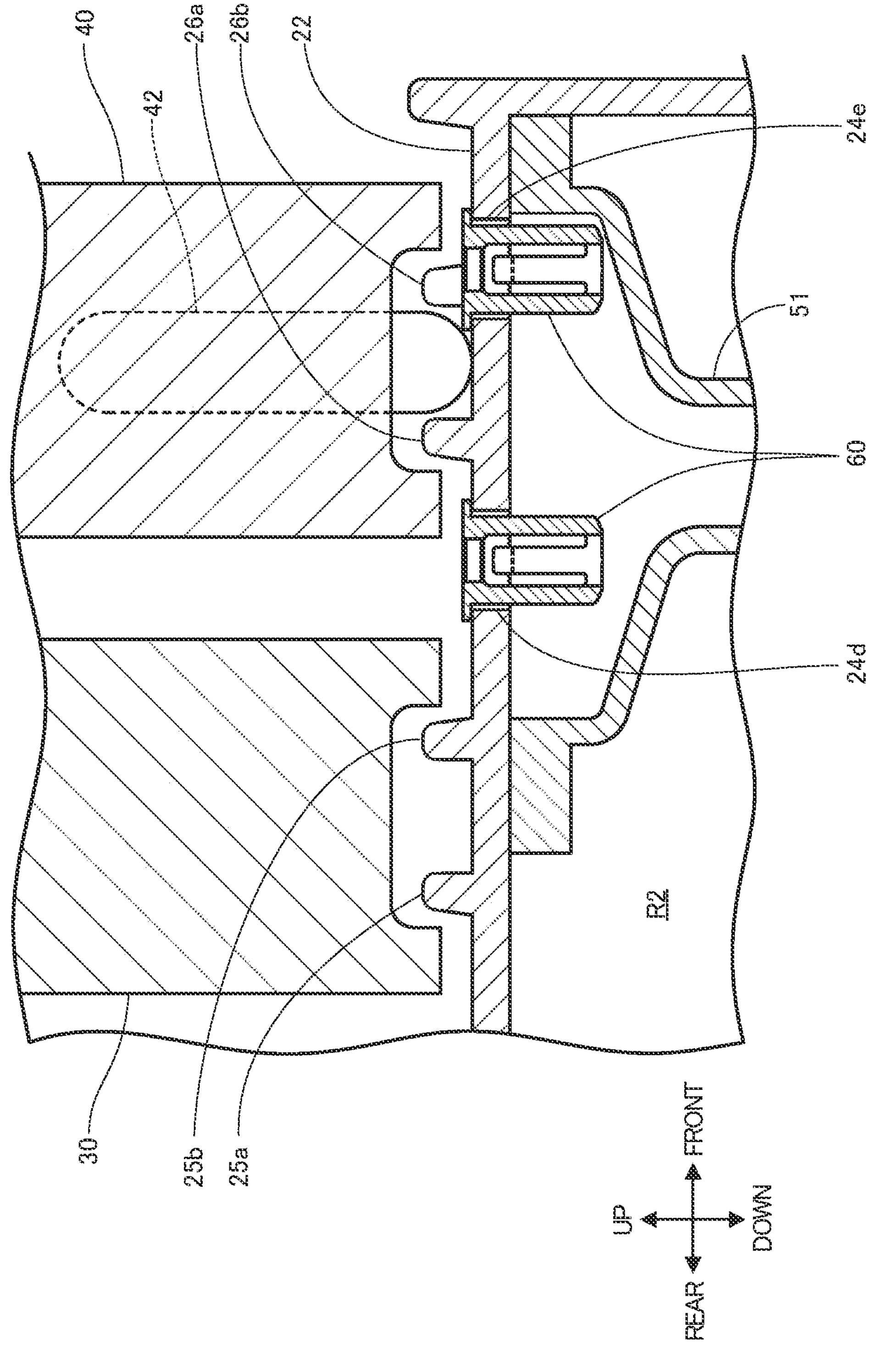
FIG. 6 is a sectional view taken along VI-VI illustrated in FIG. 2.
Figure 7:
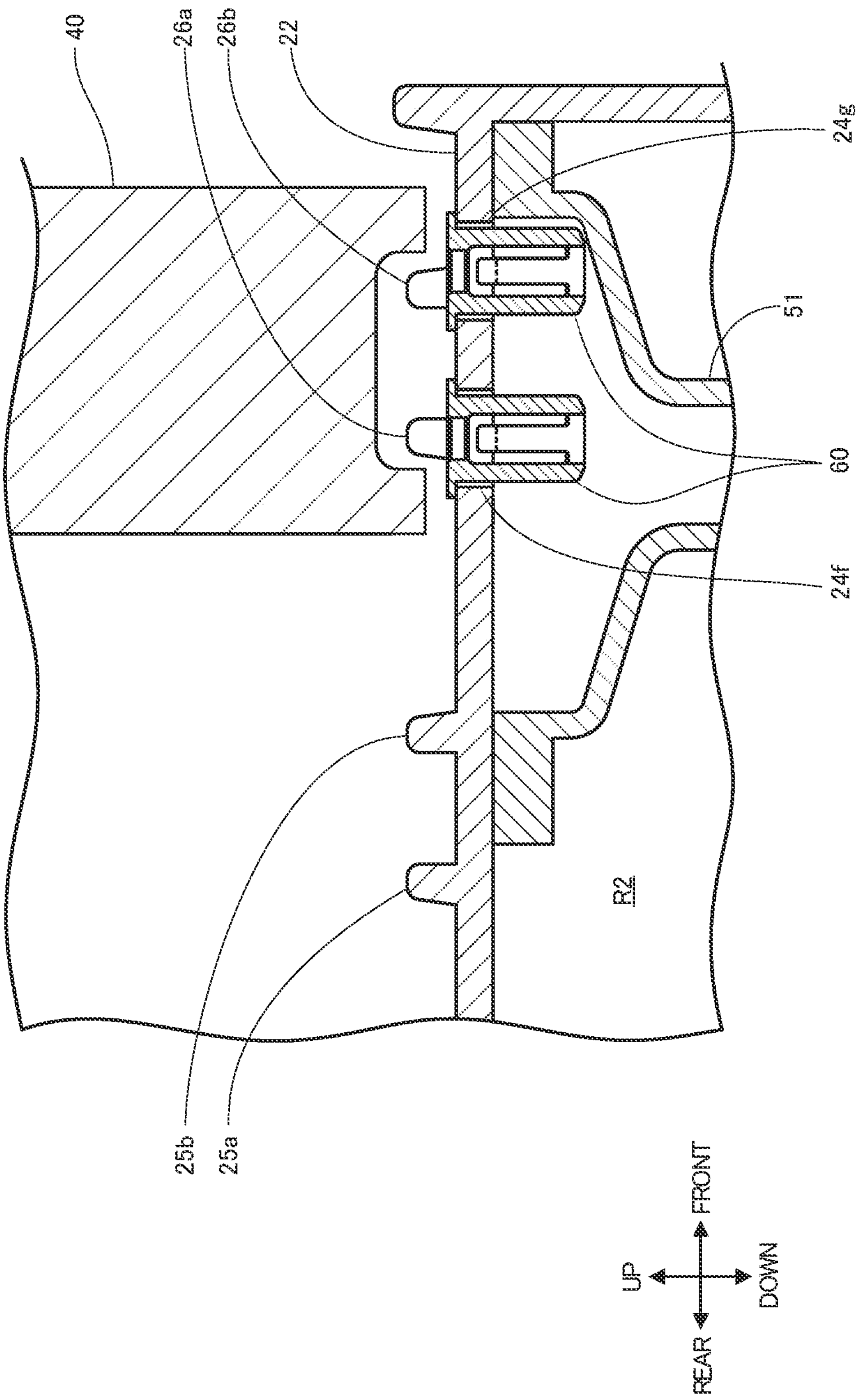
FIG. 7 is a sectional view taken along VII-VII illustrated in FIG. 3.

Drainage outlet 24 discharges condensation water accumulated at lower frame 22. Drainage outlet 24 is a hole extending through lower frame 22 along the up-down direction (FIGS. 5 to 7). A plurality of drainage outlets 24 is formed in lower frame 22. Seven drainage outlets 24 are formed. Note that naturally the number of drainage outlets 24 is not limited to seven. Note that naturally the position where drainage outlet 24 is formed is not limited to the position described later.

Figure 2:
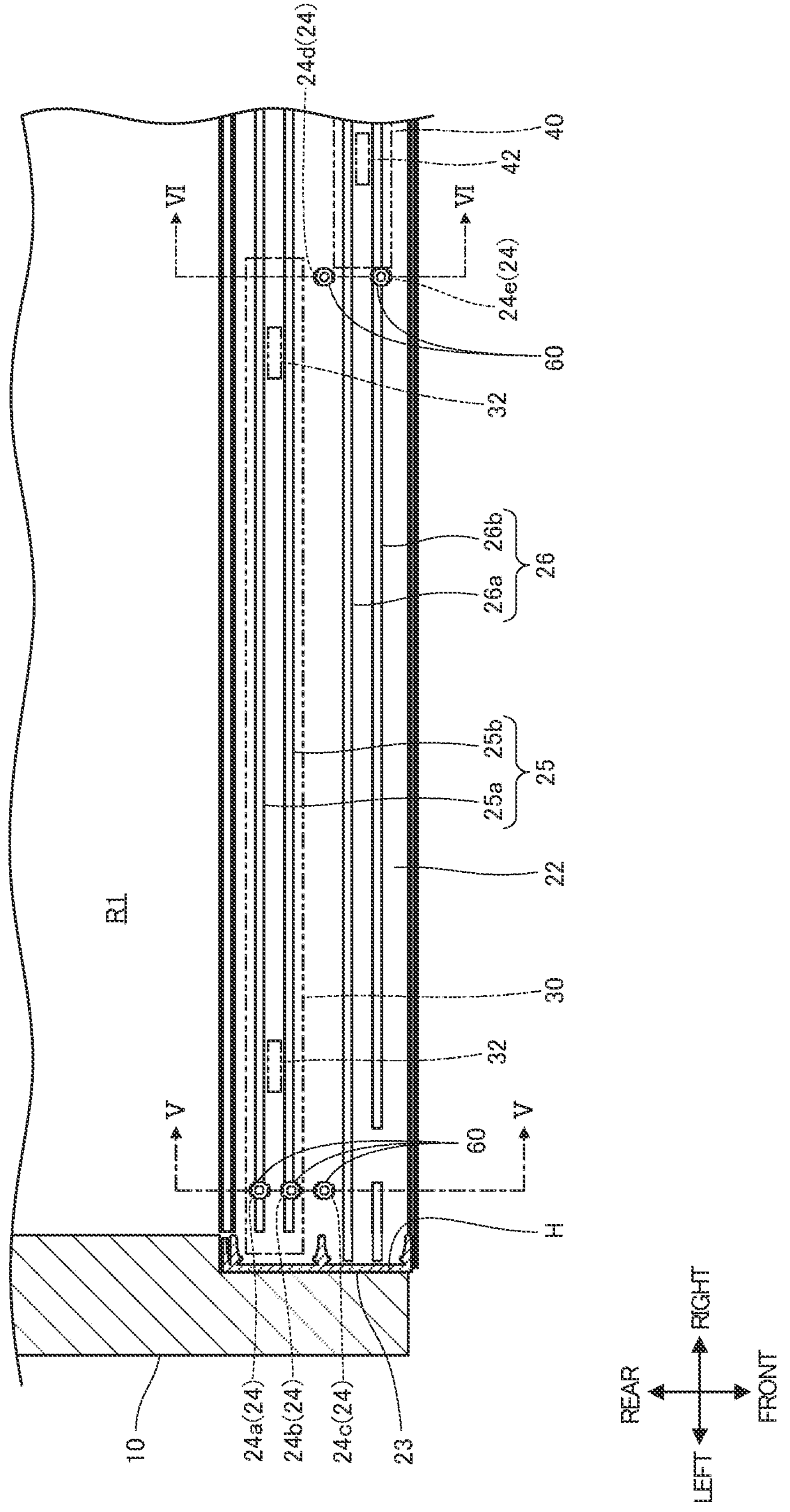
FIG. 2 is a lateral sectional view of the cold storage, and illustrates a left side of a lower frame.

As illustrated in FIGS. 2 and 5, first drainage outlet 24*a* is formed at a position dividing inner rail 25*a* on the rear side in inner rail 25 at the left end portion of lower frame 22. Second drainage outlet 24*b* is formed at a position dividing inner rail 25*b* on the front side in inner rail 25 at the left end portion of lower frame 22. Third drainage outlet 24*c* is formed between inner rail 25 and outer rail 26 at the left end portion of lower frame 22.

As illustrated in FIGS. 2 and 6, fourth drainage outlet 24*d* is formed between inner rail 25 and outer rail 26 at a center portion of lower frame 22 in the left-right direction. Fifth drainage outlet 24*e* is formed at a position dividing outer rail 26*b* on the front side in outer rail 26 at a center portion of lower frame 22 in the left-right direction.

Figure 3:
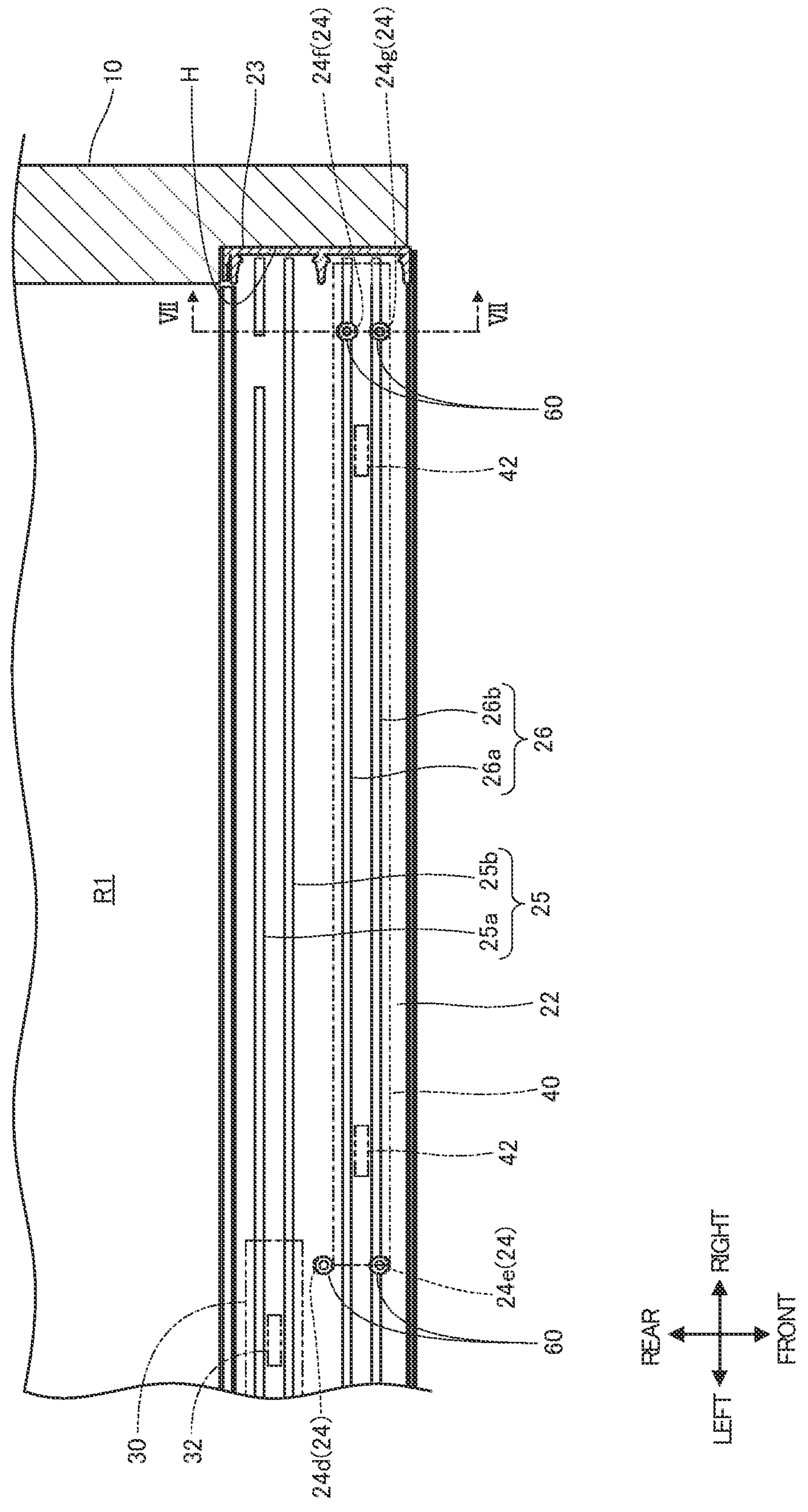
FIG. 3 is a lateral sectional view of the cold storage, and illustrates a right side of the lower frame.

As illustrated in FIGS. 3 and 7, sixth drainage outlet 24*f* is formed at a position dividing outer rail 26*a* on the rear side in outer rail 26 at the right end portion of lower frame 22. Seventh drainage outlet 24*g* is formed at a position dividing outer rail 26*b* on the front side in outer rail 26 at the right end portion of lower frame 22.

Inner sliding door 30 and outer sliding door 40 are formed in a plate-shape, and configured to open and close opening H. Inner sliding door 30 and outer sliding door 40 illustrated in FIG. 1 are located at a fully closed position for setting opening H to a closed state. When inner sliding door 30 and outer sliding door 40 are located at the fully closed position, the front surface of inner sliding door 30 and the front surface of outer sliding door 40 face the outside of cold storage 1, and the rear surface of inner sliding door 30 and the rear surface of outer sliding door 40 face the inside of cold storage 1, i.e., storage compartment R1.

When inner sliding door 30 and outer sliding door 40 are located at the fully closed position, the left end portion of inner sliding door 30 is located at the left end portion of lower frame 22, the right end portion of inner sliding door 30 and the left end portion of outer sliding door 40 are located at a center portion of lower frame 22 in the left-right direction, and the right end portion of outer sliding door 40 is located at the right end portion of lower frame 22. In addition, when inner sliding door 30 is located at the fully closed position, the left end of inner sliding door 30 makes contact with vertical frame 23 on the left side. When outer sliding door 40 is located at the fully closed position, the right end of outer sliding door 40 makes contact with vertical frame 23 on the right side.

As described above, drainage outlet 24 is formed at the left end portion, the center portion in the left-right direction and the right end portion of lower frame 22. Thus, drainage outlet 24 is formed near the end portions of inner sliding door 30 and outer sliding door 40.

Figure 4:
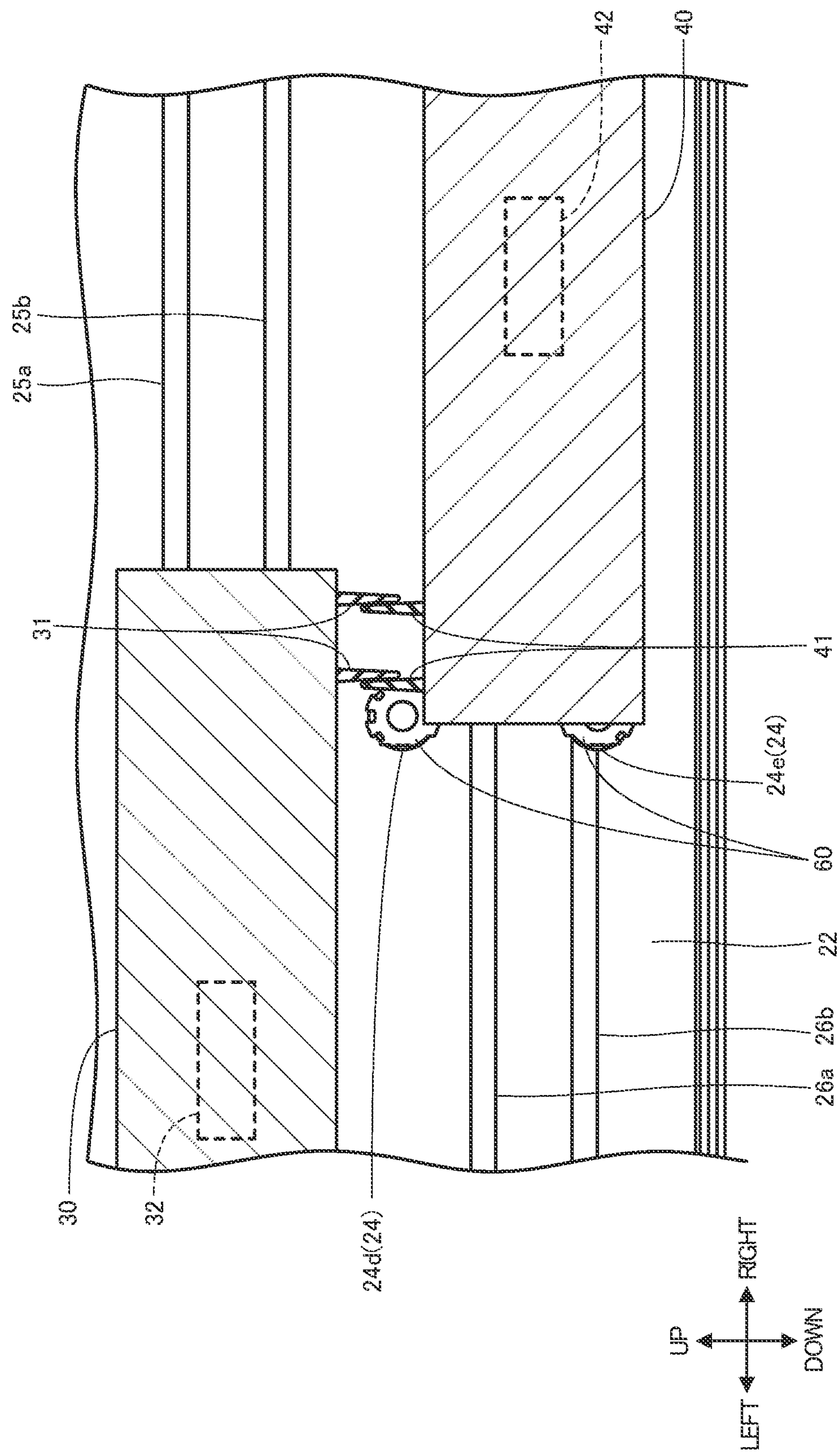
FIG. 4 is a lateral sectional view of the cold storage, and illustrates a center portion of the lower frame.

In addition, inner sliding door 30 and outer sliding door 40 include packing for sealing opening H when they are located at the fully closed position. As illustrated in FIG. 4, when inner sliding door 30 and outer sliding door 40 are located at the fully closed position, a pair of packing 31 disposed at inner sliding door 30 and a pair of packing 41 disposed at outer sliding door 40 make contact with each other, thus sealing between inner sliding door 30 and outer sliding door 40. In addition, when inner sliding door 30 and outer sliding door 40 are located at the fully closed position, packing (not illustrated in the drawing) for sealing between inner sliding door 30 and frame body 20 and between outer sliding door 40 and frame body 20 is disposed at the peripheral portion of inner sliding door 30 and the peripheral portion of outer sliding door 40.

When inner sliding door 30 moves right, or outer sliding door 40 moves left, from the state where inner sliding door 30 and outer sliding door 40 are located at the fully closed position, opening H is set to an open state.

Further, as illustrated in FIGS. 2 and 6, inner sliding door 30 and outer sliding door 40 include wheels 32 and 42. Wheels 32 and 42 are attached to the lower side of inner sliding door 30 and outer sliding door 40.

Wheel 32 of inner sliding door 30 is located between the pair of inner rails 25*a* and 25*b* of inner rail 25, and rotates in accordance with the movement of inner sliding door 30. When wheel 32 rotates, inner sliding door 30 smoothly moves along inner rail 25.

Wheel 42 of outer sliding door 40 is located between the pair of outer rails 26*a* and 26*b* of outer rail 26, and rotates in accordance with the movement of outer sliding door 40. When wheel 42 rotates, outer sliding door 40 smoothly moves along outer rail 26.

Machine storage 50 is provided on the lower side of housing 10. The inner space of machine storage 50 is machine compartment R2. A compressor and a condenser making up a refrigeration circuit that cools the inside of the storage compartment and the like are disposed in machine compartment R2.

In addition, as illustrated in FIGS. 5 and 7, drainage guide part 51 is disposed in machine storage 50. Drainage guide part 51 receives water discharged from drainage outlet 24, and guides it to a drain pan (not illustrated in the drawing) disposed in machine storage 50. The drain pan is disposed near the compressor. The water guided to the drain pan evaporates with heat dissipation from the compressor.

Figure 8:
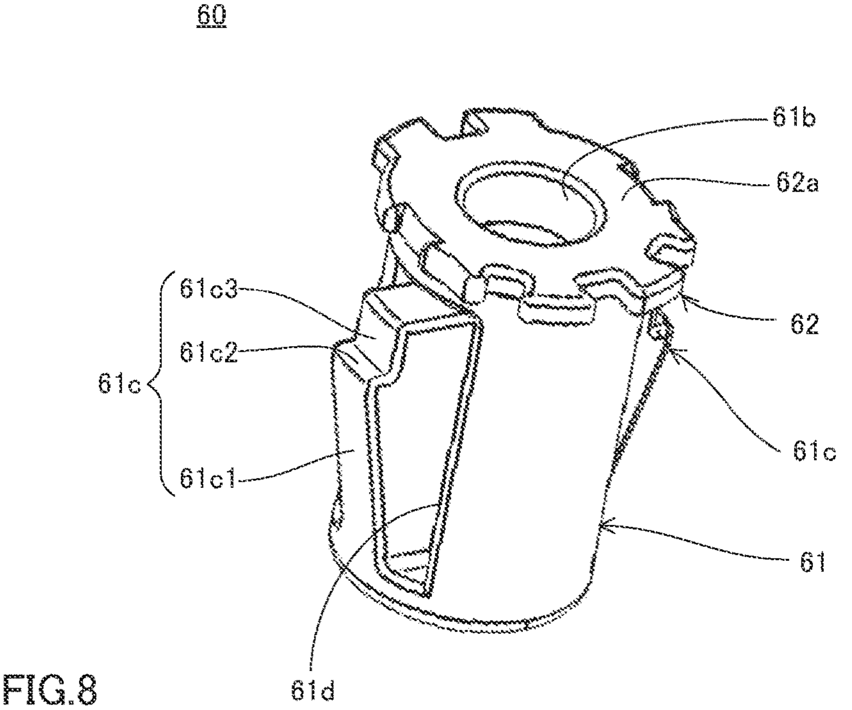
FIG. 8 is a perspective view of a drainage cap.
Figure 9:
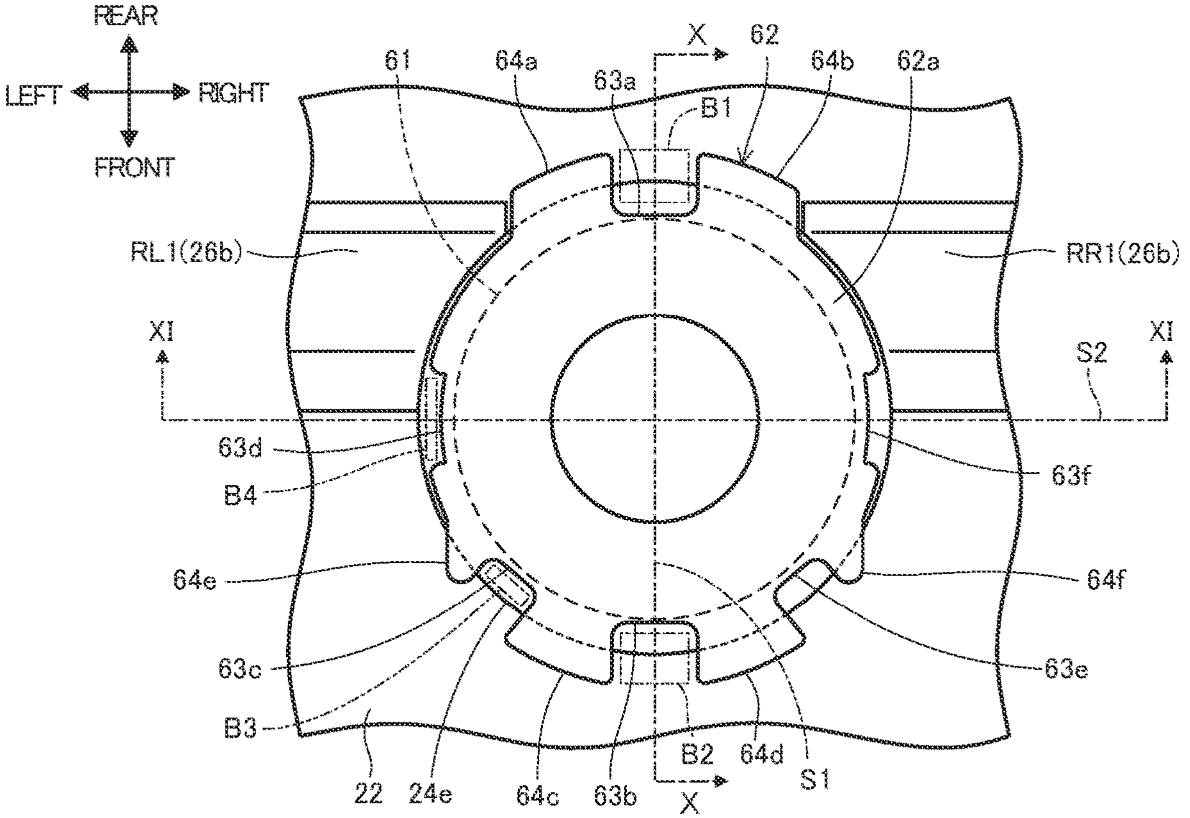
FIG. 9 is a top view illustrating a state where the drainage cap is attached to an outlet of a fifth drainage outlet.
Figure 10:
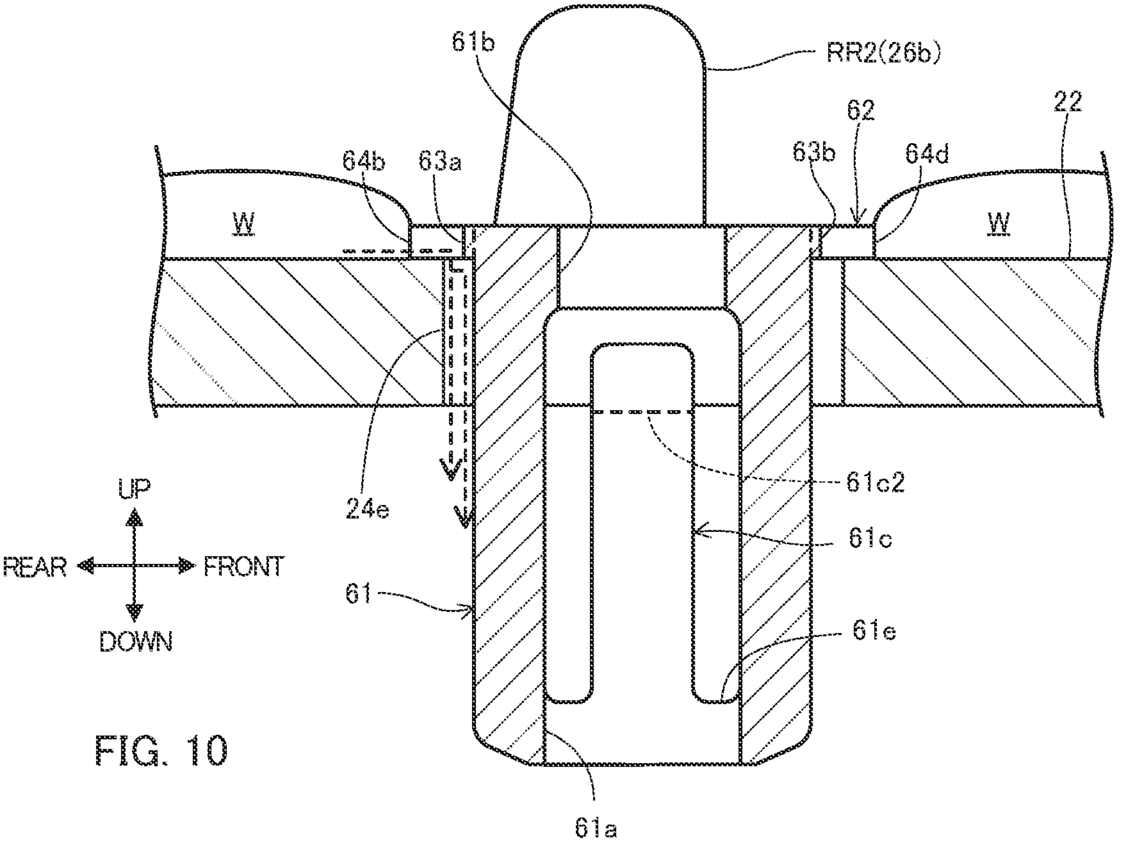
FIG. 10 is a sectional view taken along line X-X of FIG. 9.
Figure 11:
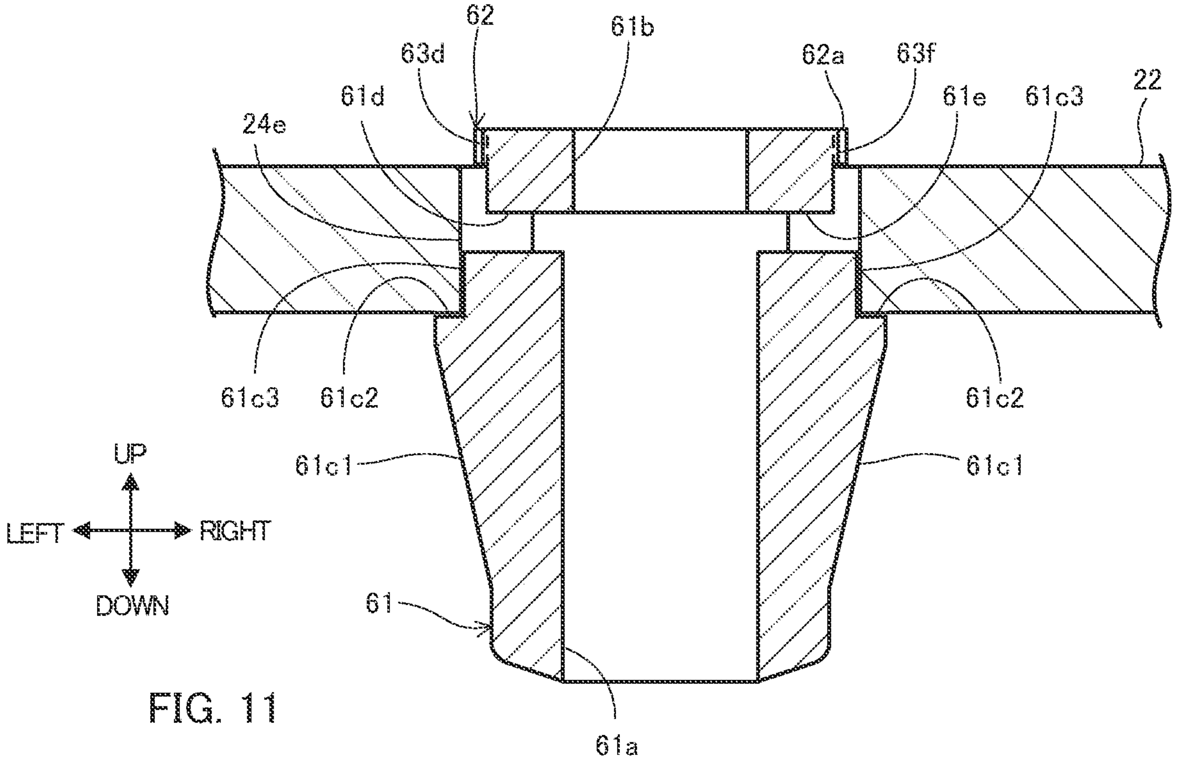
FIG. 11 is a sectional view taken along XI-XI illustrated in FIG. 9.

Drainage cap 60 illustrated in FIG. 8 is disposed at each drainage outlet 24. FIGS. 9 to 11 illustrate drainage cap 60 disposed at fifth drainage outlet 24*e*. As described above, fifth drainage outlet 24*e* is formed at a position dividing outer rail 26*b*. In the following description, in outer rail 26*b* divided by fifth drainage outlet 24*e*, outer rail 26*b* on the left side in FIG. 9 is referred to as first left rail RL1, and outer rail 26*b* on the right side in FIG. 9 is referred to as first right rail RR1. In other words, outer rail 26*b* illustrated in FIG. 9 is divided into first left rail RL1 and first right rail RR1 disposed with fifth drainage outlet 24*e* therebetween. First left rail RL1 is an example of "first rail". First right rail RR1 is an example of "second rail".

Fifth drainage outlet 24*e* is disposed such that the center is located on the front side than the center of outer rail 26*b* in the front-rear direction. Note that as with fifth drainage outlet 24*e*, second drainage outlet 24*b* is also disposed such that the center is located on the front side than the center of inner rail 25*b* in the front-rear direction. In addition, as with fifth drainage outlet 24*e*, seventh drainage outlet 24*g* is also disposed such that the center is located on the front side than the center of outer rail 26*b* in the front-rear direction.

Drainage Cap 60 Includes Body Part 61 and Flange Part 62.

Body part 61 is a portion configured to be inserted to drainage outlet 24. Body part 61 is formed in a cylindrical shape with openings at both ends. In the following description, the opening on the lower side in FIGS. 10 and 11 is first opening 61*a*, and the opening on the upper side in FIGS. 10 and 11 is second opening 61*b*. The outer diameter of body part 61 is smaller than the inner diameter of drainage outlet 24. That is, body part 61 is formed with a gap between it and drainage outlet 24. Body part 61 is provided with a pair of claw parts 61*c* facing each other in the radial direction of body part 61 at the peripheral side wall.

At the peripheral side wall of body part 61, claw part 61*c* is each provided at third opening 61*d* and fourth opening 61*e* opening in a rectangular shape and facing each other in the radial direction. Claw part 61*c* is formed in a cuboid shape protruding toward second opening 61*b* side along the axis line direction of body part 61 from a portion on first opening 61*a* side at each of third opening 61*d* and fourth opening 61*e*. Inclined part 61*c*1, step 61*c*2 and body positioning part 61*c*3 are provided at a position radially outside body part 61 at claw part 61*c*.

In a direction from the proximal end of claw part 61*c* toward the protruding end along the axis line direction of body part 61, inclined part 61*c*1 is tilted radially outward from the radial inside of body part 61. It is provided such that when body part 61 is inserted to drainage outlet 24, inclined part 61*c*1 makes contact with the peripheral part of drainage outlet 24.

When drainage cap 60 is attached to drainage outlet 24, body part 61 is inserted to drainage outlet 24 from first opening 61*a* side. When body part 61 is inserted to drainage outlet 24, inclined part 61*c*1 makes contact with the peripheral part of drainage outlet 24. Further, when body part 61 is pushed to drainage outlet 24, inclined part 61*c*1 is pushed by the peripheral part of drainage outlet 24, and the base end portion of claw part 61*c* elastically deforms such that claw part 61*c* is tilted to the radial inside of body part 61. When inclined part 61*c*1 passes through drainage outlet 24, the shape of claw part 61*c* is restored.

Step 61*c*2 is formed such that it is caught by the lower side surface of lower frame 22 in the state where drainage cap 60 is attached to drainage outlet 24. Thus, step 61*c*2 can prevent upward removal of drainage cap 60 from drainage outlet 24.

Body positioning part 61*c*3 is provided such that it makes contact with the inner peripheral surface of drainage outlet 24 in the state where drainage cap 60 is attached to drainage outlet 24. In this manner, the position of body part 61 with respect to drainage outlet 24 in the radial direction can be set. Body positioning part 61*c*3 sets the position of body part 61 such that a gap is provided between body part 61 and drainage outlet 24 over the whole circumference of body part 61.

Flange part 62 is provided on second opening 61*b* side of body part 61. Flange part 62 is formed so as not to make contact with inner sliding door 30 and outer sliding door 40. In addition, flange part 62 is formed plane symmetrically with respect to first plane S1 orthogonal to flange surface 62*a* (more specifically, the top surface and bottom surface of flange part 62). First plane S1 is a plane passing through the axis line of body part 61.

Flange part 62 is provided with notch 63 and opposing part 64.

Notch 63 is notched to the radial inside of drainage outlet 24 at the peripheral portion of flange part 62. A plurality of notches 63 is formed in flange part 62. Six notches 63 are formed. Note that naturally the number of notches 63 is not limited to six. Further, naturally the position and shape of notch 63 are not limited to the position and shape described later.

First notch 63*a* is disposed such that first portion B1, which is one of two portions where first plane S1 passes, is notched at the peripheral portion of flange part 62. In FIG. 9, first notch 63*a* is formed such that a part of the rear end portion of the peripheral portion of flange part 62 is notched. First plane S1 is an example of "plane".

Second notch 63*b* is disposed such that second portion B2, which is the other of two portions where first plane S1 passes, is notched at the peripheral portion of flange part 62. In FIG. 9, second notch 63*b* is formed such that a part of the front end portion of the peripheral portion of flange part 62 is notched.

Third notch 63*c* is formed such that third portion B3 between first portion B1 and second portion B2 is notched at the peripheral portion of flange part 62. More specifically, third portion B3 is set at a portion between second portion B2, and second plane S2 that passes through the center of flange surface 62*a* 1 and is orthogonal to first plane S, at the peripheral portion of flange part 62. In FIG. 9, third notch 63*c* is formed such that the left front end portion of the peripheral portion of flange part 62 is notched.

Fourth notch 63*d* is formed such that fourth portion B4 between first portion B1 and third portion B3 of the peripheral portion of flange part 62 is notched. Fourth portion B4 is a portion where second plane S2 passes at the peripheral portion of flange part 62. In FIG. 9, fourth notch 63*d* is formed such that the left end portion of the peripheral portion of flange part 62 is notched.

Fifth notch 63*e* is formed symmetrically with respect to third notch 63*c* and first plane S1. Specifically, in FIG. 9, fifth notch 63*e* is formed such that the right front end portion of the peripheral portion of flange part 62 is notched.

Sixth notch 63*f* is formed symmetrically with respect to fourth notch 63*d* and first plane S1. Specifically, in FIG. 9, sixth notch 63*f* is formed such that the right end portion of the peripheral portion of flange part 62 is notched.

Opposing part 64 is formed to face the peripheral portion of drainage outlet 24 at the peripheral portion of flange part 62. Opposing part 64 is provided such that the bottom surface makes contact with the top surface of lower frame 22 in the state where drainage cap 60 is attached to drainage outlet 24. When opposing part 64 makes contact with lower frame 22, drainage cap 60 is prevented from passing downward from drainage outlet 24.

A plurality of opposing parts 64 is formed. Six opposing parts 64 are formed. Note that naturally the number of opposing parts 64 is not limited to six. Further, naturally the position and shape of opposing part 64 are not limited to the position and shape described later.

First opposing part 64*a* is formed on the counterclockwise direction side (in FIG. 9 counterclockwise direction side) as viewed from second opening 61*b* side, from first notch 63*a* at the peripheral portion of flange part 62. First opposing part 64*a* is formed to extend along first plane S1 and have, at the rear end, a curved surface with a radius greater than the radius of drainage outlet 24 as viewed from second opening 61*b* side.

Second opposing part 64*b* is formed symmetrically with respect to first opposing part 64*a* and first plane S1. First opposing part 64*a* and second opposing part 64*b* are formed adjacent to first notch 63*a*.

Third opposing part 64*c* is formed adjacent to second notch 63*b* and third notch 63*c* between second notch 63*b* and third notch 63*c*. Third opposing part 64*c* is approximately fan-shaped as viewed from second opening 61*b* side. Third opposing part 64*c* is formed to have a curved surface with a radius greater than the radius of drainage outlet 24 as viewed from second opening 61*b* side, at the front end.

Fourth opposing part 64*d* is formed symmetrically with respect to third opposing part 64*c* and first plane S1. Fourth opposing part 64*d* is formed adjacent to second notch 63*b* and fifth notch 63*e* between second notch 63*b* and fifth notch 63*e*.

Fifth opposing part 64*e* is formed between third notch 63*c* and fourth notch 63*d* at the peripheral portion of flange part 62. Fifth opposing part 64*e* is approximately triangular shaped as viewed from second opening 61*b* side. The radial outer surface of fifth opposing part 64*e* is formed in a curved surface. Fifth opposing part 64*e* is formed adjacent to third notch 63*c*.

Sixth opposing part 64*f* is formed symmetrically with respect to fifth opposing part 64*e* and first plane S1. Sixth opposing part 64*f* is formed adjacent to fifth notch 63*e*.

In drainage cap 60, fifth opposing part 64*e* and sixth opposing part 64*f* are formed such that first notch 63*a* faces the inner side of the storage (the rear side in FIG. 9) than outer rail 26*b* in the state where fifth drainage outlet 24*e* is attached. When body part 61 is inserted to drainage outlet 24 such that first notch 63*a* faces the outer side of the storage (the front side in FIG. 9) than outer rail 26*b*, fifth opposing part 64*e* and sixth opposing part 64*f* are put onto first right rail RR1 and first left rail RL1, respectively. That is, at flange part 62, first notch 63*a* is prevented from being disposed to face the storage outer side than outer rail 26*b*.

In addition, in the state where drainage cap 60 is attached to fifth drainage outlet 24*e*, first opposing part 64*a*, first notch 63*a* and second opposing part 64*b* are located between first left rail RL1 and first right rail RR1.

Further, first opposing part 64*a* is formed to be able to make contact with first left rail RL1 at the side surface on the side opposite to the side surface on first notch 63*a* side in the state where drainage cap 60 is attached to fifth drainage outlet 24*e*. When first opposing part 64*a* makes contact with first left rail RL1, flange part 62 is prevented from rotating counterclockwise in top view in FIG. 9.

In addition, second opposing part 64*b* is formed to be able to make contact with first right rail RR1 at the side surface on the side opposite to the side surface on first notch 63*a* side in the state where drainage cap 60 is attached to fifth drainage outlet 24*e*. When second opposing part 64*b* makes contact with first right rail RR1, flange part 62 is prevented from rotating clockwise in top view in FIG. 9.

Further, first opposing part 64*a* and second opposing part 64*b* are formed such that first notch 63*a* is set at the center portion between first left rail RL1 and first right rail RR1 in the state where drainage cap 60 is attached to fifth drainage outlet 24*e*. Note that first plane S1 is approximately orthogonal to the left-right direction, which is the extending direction of outer rail 26*b* in the state where drainage cap 60 is attached to fourth drainage outlet 24*d*.

In addition, flange part 62 is disposed such that the second, third, and fifth notches 63*b*, 63*c* and 63*e* face the outer side of the storage than outer rail 26*b* when first notch 63*a* is disposed as described above in the state where drainage cap 60 is attached to fifth drainage outlet 24*e*.

Further, flange part 62 is disposed such that a part of fourth notch 63*d* and a part of sixth notch 63*f* face the outer side of the storage than outer rail 26*b* in the state where drainage cap 60 is attached to fifth drainage outlet 24*e*. First opposing part 64*a*, second opposing part 64*b*, fifth opposing part 64*e* and sixth opposing part 64*f* are examples of "positioning part".

Figure 12:
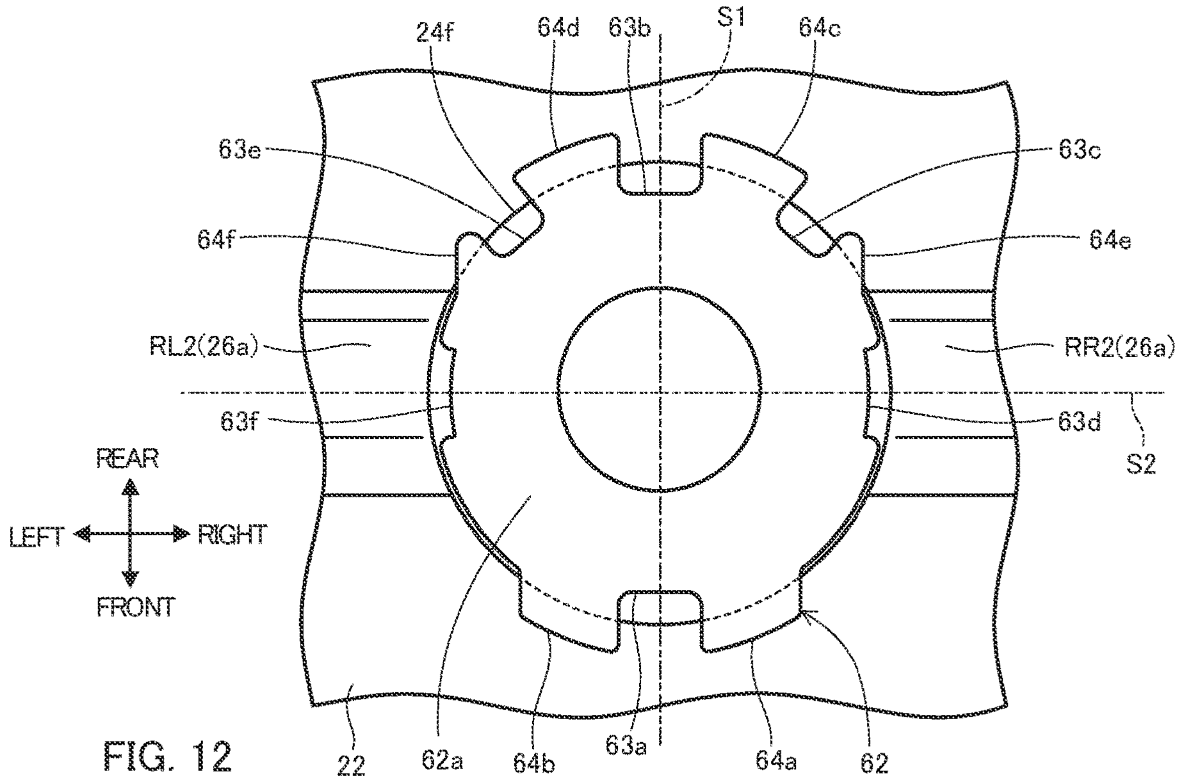
FIG. 12 is a top view illustrating a state where the drainage cap is attached to an outlet of a sixth drainage outlet.

In addition, sixth drainage outlet 24*f* illustrated in FIG. 12 is disposed such that the center is located at the center of outer rail 26*a* in the front-rear direction. In the following description, in outer rail 26*a* divided by sixth drainage outlet 24*f*, outer rail 26*a* on the left side in FIG. 12 is referred to as second left rail RL2 and outer rail 26*a* on the right side in FIG. 12 is referred to as second right rail RR2. In other words, outer rail 26*a* illustrated in FIG. 12 is divided into second left rail RL2 and second right rail RR2 disposed with sixth drainage outlet 24*f* therebetween. Second left rail RL2 is an example of "first rail". Second right rail RR2 is an example of "second rail".

As illustrated in FIG. 12, flange part 62 is disposed such that first notch 63*a* faces the outer side of the storage than outer rail 26*a*, and that the second, third, and fifth notches 63*b*, 63*c* and 63*e* face the inner side of the storage than outer rail 26*a* in the state where drainage cap 60 is attached to sixth drainage outlet 24*f*.

In addition, as illustrated in FIG. 12, fifth opposing part 64*e* is formed to be able to make contact with second right rail RR2 in the state where drainage cap 60 is attached to sixth drainage outlet 24*f*. When fifth opposing part 64*e* makes contact with second right rail RR2, flange part 62 is prevented from rotating clockwise in top view in FIG. 12.

Further, as illustrated in FIG. 12, sixth opposing part 64*f* is formed to be able to make contact with second left rail RL2 in the state where drainage cap 60 is attached to sixth drainage outlet 24*f*. When sixth opposing part 64*f* makes contact with second left rail RL2, flange part 62 is prevented from rotating counterclockwise in top view in FIG. 12.

In addition, as illustrated in FIG. 12, fifth opposing part 64*e* and sixth opposing part 64*f* are formed to set first notch 63*a* at the center portion between second left rail RL2 and second right rail RR2 in the state where drainage cap 60 is attached to sixth drainage outlet 24*f*.

Figure 13:
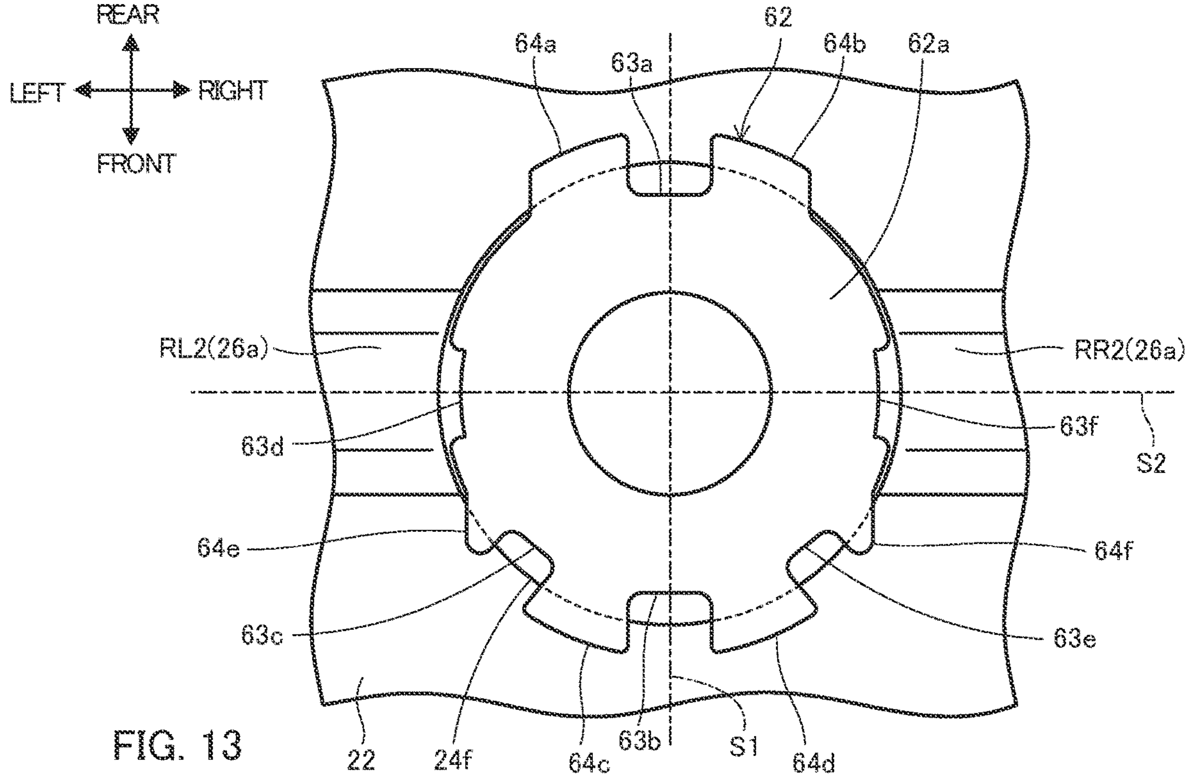
FIG. 13 is a top view illustrating a state where the drainage cap is attached to an outlet of the sixth drainage outlet.

Further, as illustrated in FIG. 13, drainage cap 60 may be attached to sixth drainage outlet 24*f* such that flange part 62 faces the direction opposite to the direction illustrated in FIG. 12 in the front-rear direction. As illustrated in FIG. 13, flange part 62 is disposed such that first notch 63*a* faces the inner side of the storage than outer rail 26*a* and that the second, third, and fifth notches 63*b*, 63*c* and 63*e* face the outer side of the storage than outer rail 26*a* in the state where drainage cap 60 is attached to sixth drainage outlet 24*f*.

In addition, as illustrated in FIG. 13, when fifth opposing part 64*e* makes contact with second left rail RL2, flange part 62 is prevented from rotating clockwise in top view in FIG. 13 in the state where drainage cap 60 is attached to sixth drainage outlet 24*f*.

Further, as illustrated in FIG. 13, when sixth opposing part 64*f* makes contact with second right rail RR2, flange part 62 is prevented from rotating counterclockwise in top view in FIG. 13 in the state where drainage cap 60 is attached to sixth drainage outlet 24*f*.

In addition, as illustrated in FIG. 13, fifth opposing part 64*e* and sixth opposing part 64*f* are formed such that first notch 63*a* is set at the center portion between second left rail RL2 and second right rail RR2 in the state where drainage cap 60 is attached to sixth drainage outlet 24*f*.

Note that in drainage cap 60 in which third and fourth drainage outlets 24*c* and 24*d* are disposed, opposing part 64 does not make contact with inner rail 25 and outer rail 26. Thus, in drainage cap 60 in which third and fourth drainage outlets 24*c* and 24*d* are disposed, the orientation of flange part 62 is not restricted.

Next, discharge of condensation water at drainage outlet 24 is described. When the temperature of storage compartment R1 decreases, the difference between the temperature of storage compartment R1 and the temperature of outside air increases. In addition, the temperature of inner sliding door 30, outer sliding door 40 and frame body 20 decreases due to the cold air in cold storage 1. Thus, condensation occurs mainly at the outer surface of inner sliding door 30 and the outer surface of outer sliding door 40. The resulting condensation is accumulated at lower frame 22 through water inner sliding door 30 and outer sliding door 40.

In addition, condensation occurs also at the left side surface of outer sliding door 40, and a portion of frame body 20 on the front side of inner sliding door 30 and outer sliding door 40. As such, the condensation water is accumulated relatively more at the left end portion, the center portion in the left-right direction, and the right end portion of lower frame 22.

The condensation water generated on the left side of inner sliding door 30 and frame body 20 is discharged from first to fifth drainage outlets 24*a*, 24*b*, 24*c*, 24*d* and 24*e*. The condensation water generated on the right side of outer sliding door 40 and frame body 20 is discharged from fourth to seventh drainage outlets 24*d*, 24*e*, 24*f* and 24*g*.

FIG. 10 illustrates condensation water accumulated near fifth drainage outlet 24*e*. In the case where drainage cap 60 is not attached to fifth drainage outlet 24*e*, condensation water W may accumulate at the periphery of fifth drainage outlet 24*e* by the surface tension and may not flow into fifth drainage outlet 24*e*.

On the other hand, in the case where drainage cap 60 is attached to fifth drainage outlet 24*e*, condensation water W located on the storage inner side than outer rail 26*b* makes contact with first opposing part 64*a* or second opposing part 64*b*, and moves through flange part 62 as indicated with broken line in FIG. 10. A part of condensation water W through flange part 62 reaches first notch 63*a* and in turn the inner peripheral surface of fifth drainage outlet 24*e*, and is discharged from fifth drainage outlet 24*e* and in turn from drainage guide part 51. In addition, another part of condensation water W through flange part 62 reaches first notch 63*a* and in turn the outer peripheral surface of body part 61, moves through body part 61, and is discharged from fifth drainage outlet 24*e* and in turn from drainage guide part 51.

In addition, condensation water W located on the outer side of the storage than outer rail 26*b* makes contact with third to sixth opposing parts 64*c*, 64*d*, 64*e* and 64*f* and moves through flange part 62. A part of condensation water W through flange part 62 reaches at least one of second to sixth notches 63*b*, 63*c*, 63*d*, 63*e* and 63*f* and in turn the inner peripheral surface of fifth drainage outlet 24*e*, and is discharged from fifth drainage outlet 24*e* and in turn from drainage guide part 51. In addition, another part of condensation water W through flange part 62 reaches at least one of second to sixth notches 63*b*, 63*c*, 63*d*, 63*e* and 63*f* and in turn the outer peripheral surface of body part 61 and moves through body part 61, and is discharged from fifth drainage outlet 24*e* and in turn from drainage guide part 51.

In addition, as illustrated in FIG. 4, the left end portion of outer sliding door 40 in the fully closed position is located on the upper side of fifth drainage outlet 24*e*. As a result, the condensation water generated at the left end portion of outer sliding door 40 may fall on the top surface of drainage cap 60. The condensation water fallen on the top surface of drainage cap 60 moves through the inside of body part 61 and is discharged from drainage outlet 24.

As described above, with drainage cap 60, the condensation water makes contact with opposing part 64 of flange part 62 and thus the condensation water can be discharged from drainage outlet 24 through notch 63. That is, drainage cap 60 can improve the drainage performance.

In addition, body part 61 is formed to have a gap between it and drainage outlet 24. Thus, the condensation water can be discharged from the part between body part 61 and drainage outlet 24.

Further, notch 63 is notched to the radial inside of drainage outlet 24. Thus, the condensation water can move to drainage outlet 24 from notch 63.

In addition, flange part 62 is formed plane symmetrically with respect to first plane S1. Thus, drainage cap 60 can discharge the condensation water located on both sides in the direction orthogonal to first plane S1 in the same manner. In the case where drainage cap 60 is attached to drainage outlet 24, first plane S1 is approximately orthogonal to the extending direction of outer rail 26*b* as described above. Thus, drainage cap 60 can discharge the condensation water located on both sides in the extending direction of outer rail 26*b* in the same manner.

Further, first notch 63*a* is formed such that first portion B1 of the peripheral portion of flange part 62 is notched. Second notch 63*b* is formed such that second portion B2 of the peripheral portion of flange part 62 is notched. Third notch 63*c* is formed such that third portion B3 between second portion B2 and first portion B1 of the peripheral portion of flange part 62 is notched. The third portion is set at a portion between second portion B2 at the peripheral portion of flange part 62, and second plane S2 that passes through the center of flange surface 62*a* and is orthogonal to first plane S1. Fourth notch 63*d* is formed such that fourth portion B4 between third portion B3 and first portion B1 of the peripheral portion of flange part 62 is notched. Fifth notch 63*e* is formed symmetrically with respect to third notch 63*c* and first plane S1. In addition, sixth notch 63*f* is formed symmetrically with respect to fourth notch 63*d* and first plane S1. Thus, the condensation water around flange part 62 can be appropriately discharged.

In addition, body part 61 is formed in a cylindrical shape with openings at both ends. Thus, the condensation water reaching the top surface of body part 61 can be discharged to drainage outlet 24 from the inside of body part 61.

Then, drainage outlet 24 is formed at a position near outer sliding door 40 and inner sliding door 30 in a closed state at lower frame 22. As described above, the condensation water is accumulated relatively more near outer sliding door 40 and inner sliding door 30 in a closed state at lower frame 22. Thus, drainage cap 60 attached to drainage outlet 24 can effectively discharge the condensation water accumulated near outer sliding door 40 and inner sliding door 30 in a closed state at lower frame 22.

In addition, drainage outlet 24 is formed at a position dividing outer rail 26*b*. Thus, the condensation water located on the storage inner side of outer rail 26*b* and the storage outer side of outer rail 26*b* can be discharged with one drainage outlet 24 and in turn one drainage cap 60.

Then, first, second, fifth and sixth opposing parts 64*a*, 64*b*, 64*e* and 64*f* are formed such that when making contact with outer rail 26*b*, first notch 63*a* and one of the second, third, and fifth notches 63*b*, 63*c* and 63*e* face the inner side of the storage than outer rail 26*b*, and that first notch 63*a* and the other of the second, third, and fifth notches 63*b*, 63*c* and 63*e* face the outer side of the storage than outer rail 26*b*. Thus, flange part 62 can pass the condensation water accumulated on the storage inner side of outer rail 26*b* to first notch 63*a* and one of the second, third, and fifth notches 63*b*, 63*c* and 63*e*, and pass the condensation water accumulated on the storage outer side of outer rail 26*b* to first notch 63*a* and the other of the second, third, and fifth notches 63*b*, 63*c* and 63*e*.

In addition, first and second opposing parts 64*a* and 64*b* set first notch 63*a* at the center portion of first left rail RL1 and second right rail RR2. Thus, as illustrated in FIG. 9, in the case where drainage outlet 24 is formed such that the center of drainage outlet 24 is located on the front side of the center of outer rail 26*b* in the front-rear direction, first notch 63*a* can be disposed near outer rail 26*b* than third and fifth notches 63*c* and 63*e*. In addition, as illustrated in FIGS. 12 and 13, in the case where drainage outlet 24 is formed such that the center of drainage outlet 24 is located at the center of outer rail 26*b* in the front-rear direction, third and fifth notches 63*c* and 63*e* can be disposed near outer rail 26*b* than first notch 63*a*. Thus, the condensation water accumulated through outer rail 26*b* can be easily carried to notch 63 and discharged from drainage outlet 24.

Further, as illustrated in FIGS. 12 and 13, in the case where drainage outlet 24 is formed such that the center of drainage outlet 24 is located at the center of outer rail 26*b* in the front-rear direction, flange part 62 can be disposed by selecting the orientation. Thus, the orientation of flange part 62 can be selected on the basis of the location where the condensation water is accumulated and its amount.

The present disclosure is not limited to the forms described so far. As long as the main purpose of this disclosure is not departed from, various modifications to this embodiment and embodiments constructed by combining components in different embodiments are also included within the scope of this disclosure.

For example, opposing part 64 may be formed to have a gap between it and the peripheral portion of drainage outlet 24. For example, a protrusion part (not illustrated in the drawing) may be provided at the lower side surface of opposing part 64. When the tip end of the protrusion part makes contact with the upper side surface of lower frame 22, a gap is formed between the lower side surface of opposing part 64 and the upper side surface of lower frame 22.

When the condensation water makes contact with opposing part 64, condensation water W passes through the external shape of opposing part 64 and in turn through the external shape of notch 63 by capillarity. A part of condensation water W through notch 63 reaches the bottom of notch 63 and in turn the outer peripheral surface of body part 61 and is discharged from fifth drainage outlet 24*e* and in turn from drainage guide part 51 through body part 61. In addition, the other part of condensation water W through notch 63 reaches first notch 63*a* and in turn the inner peripheral surface of fifth drainage outlet 24*e*, and is discharged from fifth drainage outlet 24*e* and in turn from drainage guide part 51. Note that the part of condensation water W moves through the gap between the lower side surface of opposing part 64 and the upper side surface of lower frame 22. That is, when condensation water W making contact with opposing part 64 moves through notch 63 and reaches notch 63 and in turn the outer peripheral surface of body part 61 so as to move through body part 61, the condensation water can be efficiently discharged from the gap between drainage cap 60 and the peripheral portion of drainage outlet 24.

This application is entitled to and claims the benefit of Japanese Patent Application No. 2021-019073 filed on Feb. 9, 2021, the disclosure each of which including the specification, drawings and abstract is incorporated herein by reference in its entirety.

INDUSTRIAL APPLICABILITY

The present disclosure is widely applicable to a cooling device such as a cold storage for drugs, a cold storage for blood and an incubator.

REFERENCE SIGNS LIST

1 Cold storage
10 Housing
20 Frame body
24 Drainage outlet
25*a* Inner rail (Rail)
25*b* Inner rail (Rail)
26*a* Outer rail (Rail)
26*b* Outer rail (Rail)
30 Inner sliding door (Sliding door)
40 Outer sliding door (Sliding door)
60 Drainage cap
61 Body part
62 Flange part
62*a* Flange surface
63*a* First notch (notch)
63*b* Second notch
63*c* Third notch
63*d* Fourth notch
63*e* Fifth notch
64 Opposing part
64*a* First opposing part
64*b* Second opposing part
64*c* Third opposing part
64*d* Fourth opposing part
64*e* Fifth opposing part
64*f* Sixth opposing part
B1 First portion
B2 Second portion
B3 Third portion
B4 Fourth portion
S1 First plane (Plane)
S2 Second plane
W Condensation water

The invention claimed is:

1. A drainage cap comprising:

a body part configured to be inserted to a drainage outlet and formed in a cylindrical shape extending in a first direction and having a hollow center portion, the hollow center portion having a first opening at a first end of the hollow center portion and a second opening at a second end of the hollow center portion; and a flange part provided at the first end of the hollow center portion to radially extend from the first opening so as to fully surround the first opening without closing the first opening, and including a plurality of notches and a plurality of opposing parts, each provide between adjacent notches of the plurality of notches at a peripheral portion of the flange part, the plurality of opposing parts being configured to face a peripheral portion of the drainage outlet, the plurality of notches and the plurality of opposing parts surrounding the first opening when viewed from the first direction, and a center of the flange part passing through the first opening, an outer diameter of the body part is smaller than an inner diameter of the drainage outlet so that the body part is formed to have a gap between the body part and the drainage outlet and so that condensation water can be discharged from the gap between the body part and the drainage outlet, an outer diameter the plurality of opposing parts of the flange part is larger than the outer diameter of the hollow center portion and the outer diameter of the plurality of opposing parts is larger than the inner diameter of the drainage outlet, and each of the plurality of notches is formed to be notched to inside of the drainage outlet in a radial direction.

2. The drainage cap according to claim 1, wherein the flange part is formed symmetrically with respect to a first plane extending in the first direction.

3. The drainage cap according to claim 2, wherein;

the plurality of notches includes a first notch and a second notch, the first notch is formed such that at least one of a first portion and a second portion of the peripheral portion of the flange part are notched, and the second notch is formed such that a third portion between the first portion and the second portion of the peripheral portion of the flange part is notched, the first portion and the second portion being two portions where the first plane passes.

4. The drainage cap according to claim 3, wherein the third portion of the peripheral portion of the flange part is set at a portion between the second portion and a second plane at the peripheral portion of the flange part, the second plane being a plane that passes through a center of a flange surface and is orthogonal to the first plane.

5. The drainage cap according to claim 3, wherein:

the plurality of notches includes a third notch, and the third notch is formed such that a fourth portion between the first portion and the third portion of the peripheral portion of the flange part is notched.

6. The drainage cap according to claim 1, wherein at least one of the plurality of opposing parts is formed to have a gap between the opposing part and the peripheral portion of the drainage outlet.

7. A cold storage comprising:

the drainage cap according to claim 1; and a frame body in which the drainage outlet is formed and a sliding door is disposed, wherein the drainage outlet is formed at a position near an end portion of the sliding door in a closed state.

8. A cold storage comprising:

the drainage cap according to claim 1; and a frame body in which the drainage outlet and a rail configured to guide a sliding door are formed, wherein the drainage outlet is formed at a position dividing the rail.

9. A cold storage comprising:

the drainage cap according to claim 3; and a frame body in which the drainage outlet and a rail configured to guide a sliding door are formed, wherein the drainage outlet is formed at a position dividing the rail, the flange part further includes a positioning part configured to set a position of the flange part such that by making contact with the rail, at least one of the plurality of notches faces an inner side of the storage than the rail and that at least another one of the plurality of notches faces an outer side of the storage than the rail.

10. The cold storage according to claim 9, wherein the rail is divided into a first rail and a second rail disposed to sandwich the drainage outlet; and wherein the positioning part sets at least one of the plurality of notches at a center portion between the first rail and the second rail by making contact with one of the first rail and the second rail.

11. The drainage cap according to claim 1, wherein the first opening has a circular shape.

* * * * *